(12) United States Patent
Busayarat et al.

(10) Patent No.: US 10,708,380 B2
(45) Date of Patent: Jul. 7, 2020

(54) TEMPLATING DATA SERVICE RESPONSES

(71) Applicant: Home Box Office, Inc., New York, NY (US)

(72) Inventors: Sata Busayarat, Seattle, WA (US); Jonathan David Lutz, New York, NY (US); Brandon C. Furtwangler, Issaquah, WA (US)

(73) Assignee: HOME BOX OFFICE, INC., New York, NY (US)

( * ) Notice: Subject to any disclaimer, the term of this patent is extended or adjusted under 35 U.S.C. 154(b) by 0 days.

(21) Appl. No.: 15/290,722

(22) Filed: Oct. 11, 2016

(65) Prior Publication Data
US 2017/0104842 A1 Apr. 13, 2017

Related U.S. Application Data

(60) Provisional application No. 62/240,888, filed on Oct. 13, 2015.

(51) Int. Cl.
*H04L 29/08* (2006.01)
*G06F 16/951* (2019.01)
(Continued)

(52) U.S. Cl.
CPC ........ *H04L 67/2842* (2013.01); *G06F 16/951* (2019.01); *G06T 1/20* (2013.01);
(Continued)

(58) Field of Classification Search
CPC ............. H04L 67/2842; H04L 41/5038; H04L 41/5054; H04L 43/045; H04L 43/10;
(Continued)

(56) References Cited

U.S. PATENT DOCUMENTS 6,025,837 A 2/2000 Matthews, III et al.
7,302,430 B1* 11/2007 Nagda .................... G06Q 10/06
(Continued)

FOREIGN PATENT DOCUMENTS

EP 0848554 A2 6/1998
WO 9713368 A1 4/1997
(Continued)

OTHER PUBLICATIONS

International Search Report and Written Opinion for PCT Application Serial No. PCT/US2016/056755 dated Dec. 19, 2016, 15 pages.
(Continued)

*Primary Examiner* — Philip J Chea
*Assistant Examiner* — Robert B McAdams
(74) *Attorney, Agent, or Firm* — Amin, Turocy & Watson, LLP

(57) ABSTRACT

The described technology is directed towards locating and using a template for processing data item data from a general form into a client-specific form for returning in response to a client request. A client request includes a data item identifier and client-specific information. The data item's identifier is processed into a data type and/or identifier, e.g., a string. The client-specific information is used to determine a device class, device type and/or client platform software version. The template is found in a hierarchy of templates based upon the client-specific information and the data type or data ID string, e.g., the client-specific information may be used to determine a subset of template folders that is evaluated to find a file with a filename matching the string. The folders may be ordered from most-specific to least-specific, so as to locate the most specific template file that applies.

20 Claims, 10 Drawing Sheets

(51) Int. Cl.

| | |
|---|---|
| *H04N 21/43* | (2011.01) |
| *G06T 1/20* | (2006.01) |
| *G06T 1/60* | (2006.01) |
| *G06T 11/20* | (2006.01) |
| *H04L 29/06* | (2006.01) |
| *H04L 12/24* | (2006.01) |
| *H04L 12/26* | (2006.01) |
| *H04N 21/25* | (2011.01) |
| *H04N 21/433* | (2011.01) |
| *H04N 21/482* | (2011.01) |

(52) U.S. Cl.
CPC .............. *G06T 1/60* (2013.01); *G06T 11/206* (2013.01); *H04L 41/5038* (2013.01); *H04L 41/5054* (2013.01); *H04L 43/045* (2013.01); *H04L 43/10* (2013.01); *H04L 65/105* (2013.01); *H04L 67/02* (2013.01); *H04L 67/10* (2013.01); *H04L 67/16* (2013.01); *H04L 67/28* (2013.01); *H04L 67/2833* (2013.01); *H04L 67/2852* (2013.01); *H04L 67/32* (2013.01); *H04L 67/34* (2013.01); *H04L 67/42* (2013.01); *H04N 21/251* (2013.01); *H04N 21/43* (2013.01); *H04N 21/4332* (2013.01); *H04N 21/4821* (2013.01); *H04N 21/4826* (2013.01)

(58) Field of Classification Search
CPC ....... H04L 65/105; H04L 67/02; H04L 67/16; H04L 67/2833; H04L 67/32; H04L 67/34; G06T 1/20; G06T 1/60; G06T 11/206; H04N 21/251; H04N 21/43; H04N 21/4332; H04N 21/4821; H04N 21/4826
See application file for complete search history.

(56) References Cited

U.S. PATENT DOCUMENTS

| | | | |
|---|---|---|---|
| 7,373,459 B2 | 5/2008 | Aoki et al. | |
| 7,620,653 B1 | 11/2009 | Swartz | |
| 7,793,206 B2* | 9/2010 | Lim .................. | G06F 17/30781 715/201 |
| 8,725,849 B1 | 5/2014 | Lloyd | |
| 8,849,825 B1 | 9/2014 | McHugh et al. | |
| 9,031,995 B1 | 5/2015 | Raden, II et al. | |
| 9,166,862 B1 | 10/2015 | Davis et al. | |
| 9,294,796 B2 | 3/2016 | McDonough et al. | |
| 9,419,852 B1* | 8/2016 | Heller .............. | H04L 29/08576 |
| 9,817,646 B1 | 11/2017 | Chen et al. | |
| 9,875,262 B2 | 1/2018 | McHugh et al. | |
| 9,887,885 B2 | 2/2018 | Varney et al. | |
| 9,891,938 B2 | 2/2018 | Barry et al. | |
| 9,894,119 B2* | 2/2018 | Pearl .................. | G06F 17/3007 |
| 10,042,626 B2 | 8/2018 | Nekrestyanov et al. | |
| 10,148,762 B2 | 12/2018 | Rogers et al. | |
| 10,277,704 B2 | 4/2019 | Busayarat et al. | |
| 10,320,879 B2 | 6/2019 | Nekrestyanov et al. | |
| 2001/0034771 A1 | 10/2001 | Hutsch et al. | |
| 2002/0143591 A1 | 10/2002 | Connelly | |
| 2003/0037206 A1 | 2/2003 | Benfield et al. | |
| 2003/0038836 A1 | 2/2003 | Ronald et al. | |
| 2003/0039230 A1 | 2/2003 | Ostman et al. | |
| 2003/0097357 A1 | 5/2003 | Ferrari et al. | |
| 2004/0082352 A1 | 4/2004 | Keating et al. | |
| 2004/0098744 A1 | 5/2004 | Gutta | |
| 2004/0139480 A1 | 7/2004 | Delpuch et al. | |
| 2005/0027871 A1 | 2/2005 | Bradley et al. | |
| 2005/0289168 A1 | 12/2005 | Green et al. | |
| 2006/0236221 A1* | 10/2006 | McCausland ......... | G06Q 30/02 715/201 |
| 2007/0130163 A1 | 6/2007 | Perez et al. | |
| 2009/0125809 A1 | 5/2009 | Trapani et al. | |
| 2009/0138441 A1 | 5/2009 | Valentine et al. | |
| 2009/0164414 A1 | 6/2009 | Tatzel et al. | |
| 2009/0193044 A1 | 7/2009 | Buehrer et al. | |
| 2009/0282432 A1 | 11/2009 | Hahnefeld et al. | |
| 2010/0063878 A1 | 3/2010 | Bachet et al. | |
| 2010/0070447 A1* | 3/2010 | Pfuntner ............. | G06F 11/3006 706/47 |
| 2010/0257204 A1 | 10/2010 | Orlov et al. | |
| 2011/0145327 A1 | 6/2011 | Stewart | |
| 2011/0246471 A1 | 10/2011 | Rakib | |
| 2011/0289458 A1 | 11/2011 | Yu et al. | |
| 2011/0289533 A1 | 11/2011 | White et al. | |
| 2011/0314326 A1 | 12/2011 | Mahajan et al. | |
| 2012/0197908 A1 | 8/2012 | Unno | |
| 2012/0215684 A1 | 8/2012 | Kidron | |
| 2013/0024851 A1 | 1/2013 | Firman et al. | |
| 2013/0031204 A1 | 1/2013 | Graham et al. | |
| 2013/0046849 A1 | 2/2013 | Wolf et al. | |
| 2013/0346539 A1 | 12/2013 | Sivasubramanian et al. | |
| 2014/0006951 A1 | 1/2014 | Hunter | |
| 2014/0040301 A1 | 2/2014 | Chadha et al. | |
| 2014/0047073 A1 | 2/2014 | Beme | |
| 2014/0181137 A1 | 6/2014 | Stein | |
| 2014/0223099 A1 | 8/2014 | Kidron | |
| 2014/0223303 A1 | 8/2014 | Cox et al. | |
| 2015/0026238 A1 | 1/2015 | Natarajan | |
| 2015/0051749 A1 | 2/2015 | Hancock et al. | |
| 2015/0149544 A1 | 5/2015 | Zhang | |
| 2016/0070447 A1 | 3/2016 | Righter et al. | |
| 2016/0085772 A1 | 3/2016 | Vermeulen et al. | |
| 2016/0086260 A1 | 3/2016 | Vermeulen et al. | |
| 2016/0105710 A1 | 4/2016 | Watson et al. | |
| 2016/0140002 A1 | 5/2016 | Fee et al. | |
| 2016/0337426 A1 | 11/2016 | Shribman et al. | |
| 2017/0006036 A1 | 1/2017 | Bellingham | |
| 2017/0032005 A1 | 2/2017 | Zheng et al. | |
| 2017/0041296 A1 | 2/2017 | Ford et al. | |
| 2017/0103553 A1 | 4/2017 | Busayarat et al. | |
| 2017/0104838 A1 | 4/2017 | Busayarat et al. | |
| 2017/0105049 A1 | 4/2017 | Busayarat et al. | |
| 2017/0177333 A1 | 6/2017 | Busayarat et al. | |
| 2017/0323028 A1 | 11/2017 | Jonker et al. | |
| 2018/0060248 A1 | 3/2018 | Liu et al. | |
| 2018/0131633 A1 | 5/2018 | Li | |
| 2019/0095395 A1 | 3/2019 | Piecko | |

FOREIGN PATENT DOCUMENTS

| | | |
|---|---|---|
| WO | 2007054687 A1 | 5/2007 |
| WO | 2011102824 A2 | 8/2011 |
| WO | 2017004138 A1 | 1/2017 |

OTHER PUBLICATIONS

Office Action for U.S. Appl. No. 15/285,439 dated Jul. 27, 2017, 27 pages.
Notice of Allowance for U.S. Appl. No. 15/252,166 dated Mar. 22, 2018, 40 pages.
Office Action for U.S. Appl. No. 15/285,439 dated Feb. 2, 2018, 23 pages.
El-Ansary, et al., "An Overview of Structured P2P Overlay Networks," In: Handbook on Theoretical and Algorithmic Aspects of Sensor, Ad Hoc Wireless, and Peer-to-Peer Networks 1 led] Jie Wu, Auerbach Publications, 2006, 27 pages.
Non-Final Office Action received for U.S. Appl. No. 15/291,247 dated Jun. 14, 2018, 43 pages.
Office Action received for Colombian Application Serial No. NC2018/0005094 dated May 22, 2018, 3 pages (with English translation).
Non-Final Office Action received for U.S. Appl. No. 15/285,439 dated Jul. 25, 2018, 32 pages.
Chinese Office Action received for Chinese Patent Application Serial No. 201690001472.1 dated Aug. 17, 2018, 2 pages.
Non-Final Office Action received for U.S. Appl. No. 15/291,810 dated Nov. 19, 2018, 43 pages.
Final Office Action received for U.S. Appl. No. 15/285,439 dated Jan. 30, 2019, 41 pages.
International Search Report and Written Opinion received for International Application Serial No. PCT/US2018/030717 dated Aug. 7, 2018, 16 pages.

(56) References Cited

OTHER PUBLICATIONS

European Office Action for European Application Serial No. 16787677.0 dated May 30, 2018, 3 pages.
Non-Final Office Action received for U.S. Appl. No. 15/449,229 dated Jun. 28, 2019, 52 pages.
Notice of Allowance for U.S. Appl. No. 15/291,810 dated Apr. 22, 2019, 22 pages.
Communication pursuant to Article 94(3) EPC received for EP Patent Application Serial No. 16787677.0 dated Mar. 13, 2019, 8 pages.
Non-Final Office Action received for U.S. Appl. No. 15/584,142 dated Apr. 29, 2019, 144 pages.
Notice of Allowance received for U.S. Appl. No. 16/054,278 dated Dec. 18, 2019, 58 pages.
Final Office Action received for U.S. Appl. No. 15/584,142 dated Nov. 6, 2019, 155 pages.
International Search Report and Written Opinion for International Application Serial No. PCT/US2019/055851 dated Nov. 22, 2019, 13 pages.
Summons to attend oral proceedings pursuant to Rule 115(1) EPC received for EP Application Serial No. 16787677.0 dated Dec. 6, 2019, 7 pages.
Non-Final Office Action received for U.S. Appl. No. 15/285,439 dated Jul. 25, 2019, 39 pages.
Second Office Action received for Colombian Application Serial No. NC2018/0005094 dated Jul. 4, 2019, 30 pages (with English translation).
Notice of Allowance received for U.S. Appl. No. 15/584,142 dated Feb. 21, 2020, 30 pages.
Non-Final Office Action received for U.S. Appl. No. 16/290,224 dated Apr. 22, 2020, 87 pages.

* cited by examiner

TEMPLATING DATA SERVICE RESPONSES

CROSS-REFERENCE TO RELATED APPLICATION

The present application claims priority to U.S. provisional patent application Ser. No. 62/240,888, filed Oct. 13, 2015.

COPYRIGHT DISCLAIMER

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Data services provide the data for a content distribution network. For example, in addition to streamed video content, a video streaming service provides a significant amount of information to client devices. Such information includes interactive content such as menus containing selectable items, which are obtained from data services. For example, each item may represent some video content available for viewing, such as a movie or television show, which is obtained from data services.

To provide data to the many different types of clients that may use the video streaming service, various customizations need to be considered. For example, streamed video data needs to match the hardware requirements of the device on which the video is being played. As another example, an icon or tile (an interactive user interface object that may assemble content such as an icon, text, an image, video and so on into a visible container for selection) used to represent an available movie or television show presented on one client device type may not be suitable when presented on another client. As a more particular example, a large television display (sometimes referred to as corresponding to a ten-foot user interface, in which "ten-foot" refers to an approximate viewing distance) is likely to be able to show a more detailed tile than a small screen mobile phone device, or a three-foot user interface such as a computer monitor. Conversely, a relatively small tile may be too small to be easily viewed and interacted with on a larger display.

Further, the data returned to a client device needs to be expected by the software program running on the device that consumes the data, including by a particular version of the software program. For example, consider a data request that results in a response containing the data composed from three separate data pieces X, Y and Z. If a client device running software version 2.0 expects X, Y and Z data to be present in a response, then such a response is appropriate. However, an earlier version software program (e.g., version 1.0) running on the same type of device may only be designed to handle a response containing X and Y data, and such a program may fail if given the full X, Y and Z response.

The many different nuances and subtleties of client devices, including possibly different software versions that may be run on the same type of device, need to be considered when returning data to client requestors.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, the technology described herein is directed towards receiving, at a data service, a client request for data of an identified data item from a client device, and selecting a template based upon the identified data item and client-specific information. The data of the identified data item is obtained in a general form that is not client-specific. Described is processing the data of the identified data item in the general form, based upon information in the template, into data of the identified data item data in a client-specific form, and returning the data in the client-specific form of the identified data item from the data service to the client device in response to the client request.

Other advantages may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
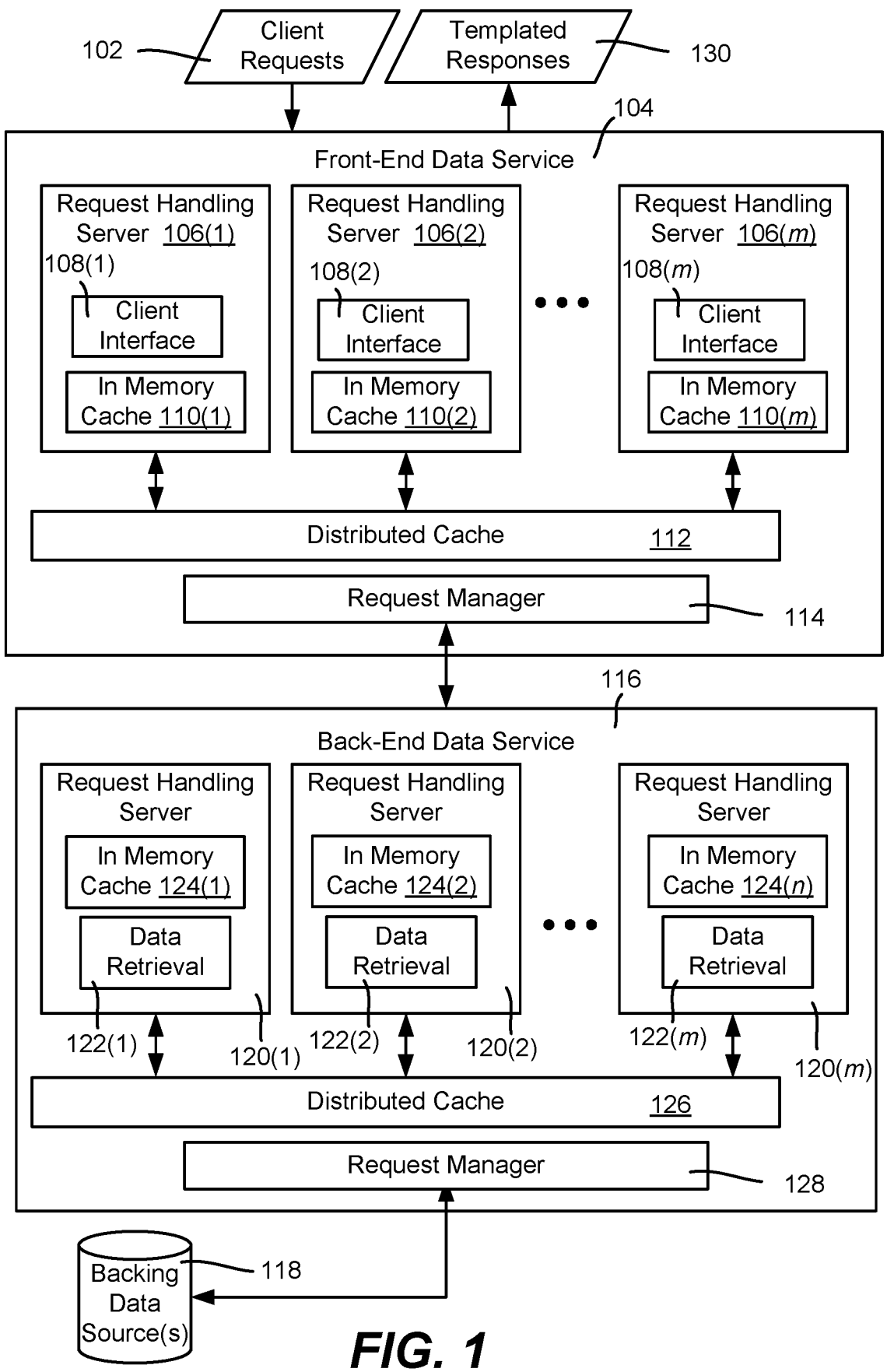
FIG. 1 is an example block diagram representation of components that handle requests for data to return templated responses, according to one or more example implementations.

Various aspects of the technology described herein are generally directed towards formatting and/or shaping data for a requesting client entity, that is, a client device class, device type and/or software program version running on the device that requested the data from a data service. In general, when data of a data item is requested, that data is arranged in a general format that applies to various device classes, device types and/or software program versions. Before returning the data to the requesting entity, the data are processed, based upon client-specific information (e.g., within an authorization/access token, or alternatively within information contained within a User-Agent HTTP request header) sent with the request, into response data that are shaped and formatted for the requesting entity.

In one or more implementations, data item requests are received at a front-end client interfacing part of the data service. A back-end part of a data service returns the requested data, but not in any client-specific format or shape. Such data may be cached at the data service front end. Thus, requested data is generally returned from the back end data service (and also cached at and returned from the front-end data service) in a common way, for any requesting entity.

As described herein, for each client request, the data service (e.g., the front end) employs a templating system that processes the corresponding data from the front-end cache or back-end part of the data service into the appropriate format and shape that is customized for each requesting entity. The template is selected based upon the data item identifier (ID), such as a URN, and the client device class or type, and/or software version of the client.

In one or more implementations, a templating system (e.g., incorporated into or otherwise associated with the front-end part of the data service) uses a hierarchical organization of templates corresponding to the various types of client devices (or device classes) and/or different versions of the client software program. Based upon the client device, device class and/or software version information sent with the request, (e.g., in the token), and the requested data item, the templating system locates an appropriate set of templates from the hierarchy, and from that set selects a template for the data item. The selected template is used to process returned data into the format and shape expected by each client. In one or more implementations, the hierarchy is based upon a file system hierarchy of folders that contain files for the templates.

As will be understood, the use of templates as described herein provides a highly efficient way to format and/or shape data for each client request based upon client-specific information. Further, the use of templates avoids reprogramming the front end client request handling server code, e.g., every time a new device is introduced and/or a new version of client software is released. Instead, one or more corresponding templates are inserted into the template hierarchy to support any such change, and the front-end client request handling server code automatically starts using the new template. A template also may be replaced in the template hierarchy with an updated one, such as if the template being replaced contained an error, and templates may be removed from the hierarchy, such as when a device/software version is no longer supported.

It should be understood that any of the examples herein are non-limiting. For instance, some of the examples refer to a data service associated with video streaming that returns video data, and also returns catalog items, such as built from various data sources to represent television content such as movies or shows. However, the technology described herein is independent of any particular type of data being returned. Further, the technology described herein is exemplified with respect to a data service having a front-end/client facing portion and a back-end service portion that obtains and returns data to the data retrieval service as needed; however, this is only one implementation, and a single data service that operates to respond to client requests without a separate front end and back end portions may benefit from the technology described herein. As another example, a file system is used as the hierarchy in one or more implementations, but any mechanism that can relate client request information into template references (e.g., a database) may be used in alternative implementations. As such, the technology described herein is not limited to any particular embodiments, aspects, concepts, structures, functionalities or examples described herein. Rather, any of the embodiments, aspects, concepts, structures, functionalities or examples described herein are non-limiting, and the technology may be used in various ways that provide benefits and advantages in computing and data retrieval/processing in general.

FIG. 1 is a block diagram representing example components that may be used to provide and work in conjunction with data requests as described herein. In FIG. 1, client requests 102 are received at a (e.g., front-end) data service 104. One such data service 104 comprises a cluster of generally load-balanced server machines 106(1)-106(m), where m represents any practical number of server (virtual and/or physical) machines.

In one or more implementations, for handling client requests, the load-balanced server machines 106(1)-106(m) each have a client interface 108(1)-108(m), respectively. Some client data requests may be satisfied by data from a front-end in-memory cache, 110(1)-110(m), respectively. Also shown in FIG. 1 is a distributed cache 112, e.g., a REDIS cache shared among the request handling servers 106(1)-106(m) that also maintains data for responding to client requests. In a typical implementation, the distributed cache 112 is larger than the individual in-memory caches 110(1)-110(m), and has a higher hit rate; however the distributed cache 112 takes longer to access, e.g., needing a network request and response. Those client data requests that cannot be satisfied by front-end cached data are sent by a front-end request manager 114 to a back-end data service 116 over a suitable network connection or the like.

Further shown in FIG. 1 is a back-end data service 116 that is coupled to one or more backing data sources 118. In one or more implementations, the back-end data service 116 comprises a cluster of generally load-balanced server machines 120(1)-120(n), where n represents any practical number of such server (virtual and/or physical) machines. In FIG. 1, the exemplified load-balanced data server machines 120(1)-120(m) each have a data retrieval component 122 (1)-122(n), and an in-memory cache 124(1)-124(n). A back-end distributed cache 126 likewise is typically provided.

For requests that reach the back-end data service 116 but cannot be satisfied from any back-end cache, the back-end data service 116 is further coupled (e.g., via an intranet and/or the internet 120) to send requests for data to the one or more various backing data sources 118. Non-limiting examples of such data sources 118 may include key-value stores, relational databases, file servers, and so on that may maintain the data in virtually any suitable format. A client request for provider data may correspond to multiple subrequests, and these may be to one or more of the backing data sources 118. Moreover, one data store's data may override another data store's data; e.g., the data for a television show may include a generic image URL obtained from one data store, however an "editorial"-like data store may override the generic image with a different image, such as for some uncharacteristic episode.

Whether via cached data or via the backing data sources, templated responses 130 to the client requests 102 are returned to each requesting client entity. Described herein is formatting those templated responses 130 via a selected template before returning them, so that each requesting client entity receives the data in a way that each requesting entity expects.

Figure 2:
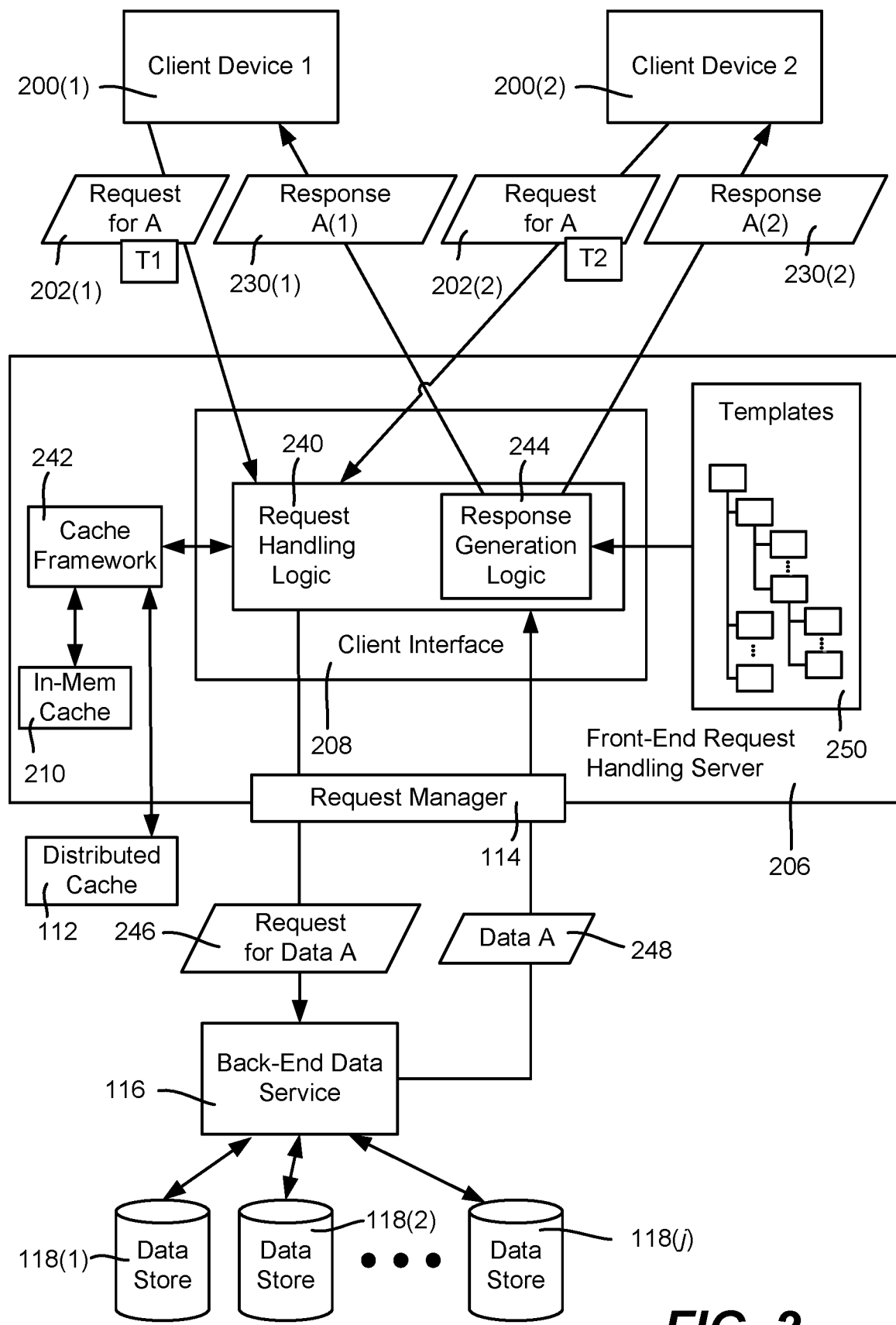
FIG. 2 is an example block diagram representation of components that use templates to return responses in different formats and/or shapes based upon different requesting client devices, according to one or more example implementations.

FIG. 2 shows additional details of a front-end request handling server 206 in one or more example implementations. A client device 1 labeled 200(1) and a client device 2 labeled 200(2) send data requests 202(1) and 202(2), respectively, for data corresponding to data item A, where "A" represents some service-unique identifier as described herein. The requests 202(1) and 202(2) may be sent at the same time or at different times. Each request 202(1) and 202(2) is associated with an authorization/access token or the like, T1 and T2, respectively, that provides client-specific information regarding the requesting entity, such as the device type (e.g., tablet, smartphone, entertainment and gaming console, personal computer browser, internet television device and so on, which may include being identified by device model and vendor), as well as possibly software version information regarding the client software platform that is making the request.

Request handling logic 240 of the client interface 208 receives the requests 202(1) and 202(2). In one or more example implementations, to check for cached data, the request handling logic 240 communicates with a cache framework 242 (e.g., an instantiated library), which handles cache read-through and write-through operations. If the requested data item's data (e.g., for data item A) is cached and not expired, response generation logic 244 processes the data as described herein for returning appropriate responses 230(1) and 230(2) to the requesting clients 202(1) and 202(2), respectively. The response generation logic 244 is coupled to the request handling logic 240/client interface 208, e.g., whether as a separate component or a component incorporated into the request hander logic 240.

For a data item request that does not have valid front-end cached data, the request manager 114 makes a request 246 for the data to the back end data service 116. The data may be cached at the back end data service 116, or if not, is obtained from one or more backing data stores 118(1)-**118(*j*). Note that the data for a data item A, such as a feature that represents a movie, may be composed from different parts, e.g., a movie title, a rating, a plot summary, a URL to a representative image and so on, (some of which may be overridden by an editorial data store or the like), and thus the back-end data service 116 may need to make separate requests to one or more of the backing data stores 118(1)-118(*j*)**.

If not cached at the front end, in a typical situation in which no errors occurred, whether obtained via a back-end cache or a backing data store or stores, the data for data item A 248 is returned from the back end data service 116. The data of the response 248 may be cached by the cache framework 242 (e.g., in both the in-memory cache 210 and the distributed cache 112), and is provided to the response generation logic 244. Note that FIG. 2 generally represents caching before templating is applied; this may be one type of caching, however it is an alternative to cache templated data after templating is applied, or to cache both data before templating is applied and after templating is applied.

As described herein, the response generation logic 244 uses a template from among a template hierarchy 250 that is selected based upon the identified data item request and the client-specific information (e.g., in each client token T1 or T2 or otherwise associated with the request) to return a response 230(1) or 230(2) that is formatted for that client. Thus, if client device 200(1) and 200(2) differ with respect to the data format/shape they are each expecting, the response 230(1) that contains data item A's data differs in format and/or shape from the response 230(2) that also contains data item A's data.

Figure 3:
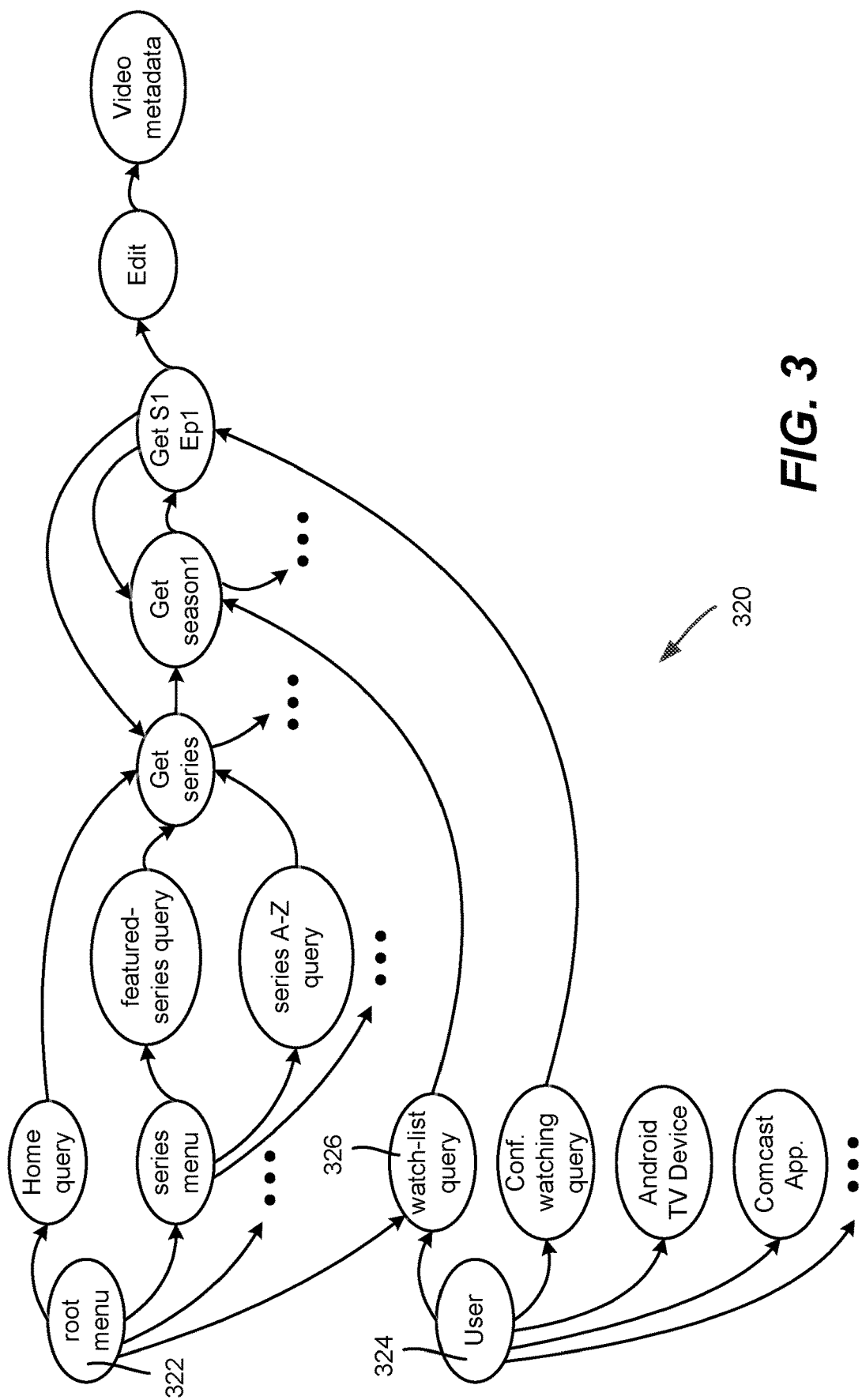
FIG. 3 is an example representation of a taxonomy of items in a client content graph that may be built from client requests and templated responses, according to one or more example implementations.

In one or more example implementations, the data items may correspond to nodes of a client user interface graph, referred to as providers. The client graph thus has providers (nodes) representing user interface objects such as menus, tiles, buttons, icons and so forth, with relationships between the providers based upon references (edges) to other providers. FIG. 3 shows an example partial graph representation 320 comprising providers (nodes) including a root menu provider 322 and a user provider 324, along with various child providers, e.g., menus and sub-menus that group features providers or the like (e.g., tile objects representing television episodes) together. As can be seen, in one or more implementations the providers may include menus, query nodes for obtaining specific data nodes and so on. In this example graph representation 320, the root menu provider 322 and the user provider 324 both link to the specific user's watch-list query provider 326, and thus the root menu presents a tile or the like for the client user to navigate to a menu or the like containing that user's specific data of interest, e.g., including the user's favorite series tiles.

Figure 4:
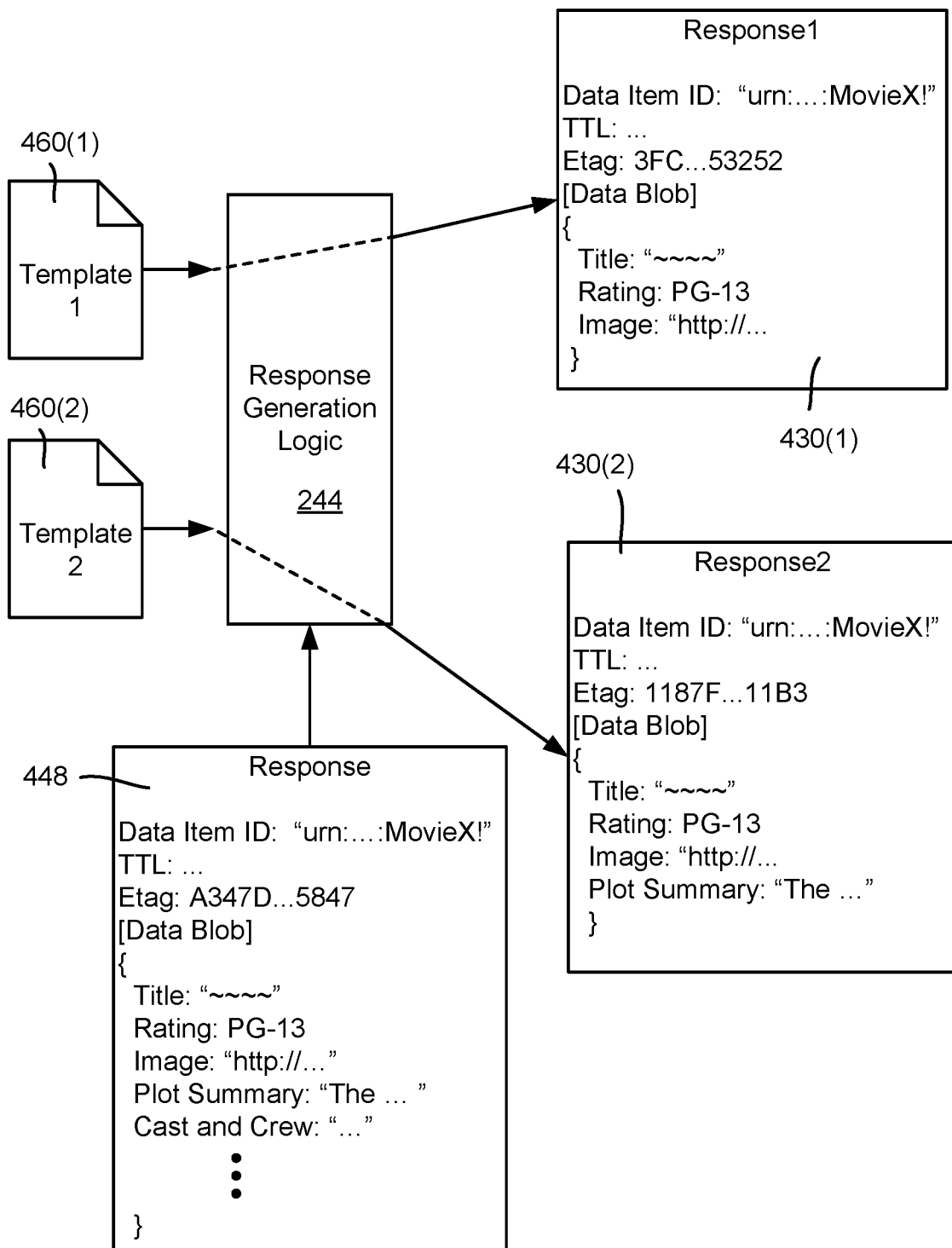
FIG. 4 is an example block diagram representation of how templates may be used to process a general data response into templated data responses in different formats and/or shapes, according to one or more example implementations.

FIG. 4 is directed towards describing how templates may be used to return data of data items, such as providers, into a form (e.g., format and shape) expected by each client. In the simplified example represented in FIG. 4, consider that a response 448 to a request for a movie's (e.g., hypothetically named "MovieX!") data item uniquely identified by a URN (e.g., "urn: . . . : MovieX!") is obtained for processing by the response generation logic 244 (FIG. 2 and FIG. 4). Based upon the data item ID and each token associated with each request, one template1 (460(1)) and another template2 (460(2)) are selected for each response.

In this example, via the template1 460(1) the response generation logic 244 removes (at least) the "Plot Summary" and "Cast and Crew" information from the response 448 (e.g., part of a JSON—JavaScript® Object Notation—data blob) to provide the data in the form of a formatted and shaped response1 430(1) for returning to one client; e.g., because the requesting client software is not equipped to handle anything other than the title, rating and image reference. Another request from a different client has a different template2 (460(2)) selected and applied, and thus gets the data of the data item 448 in a different form in the response 430(2), comprising the title, rating, image reference and Plot Summary, (which has the "Cast and Crew" information removed, because this other device/software is not equipped to handle this information).

Figure 5:
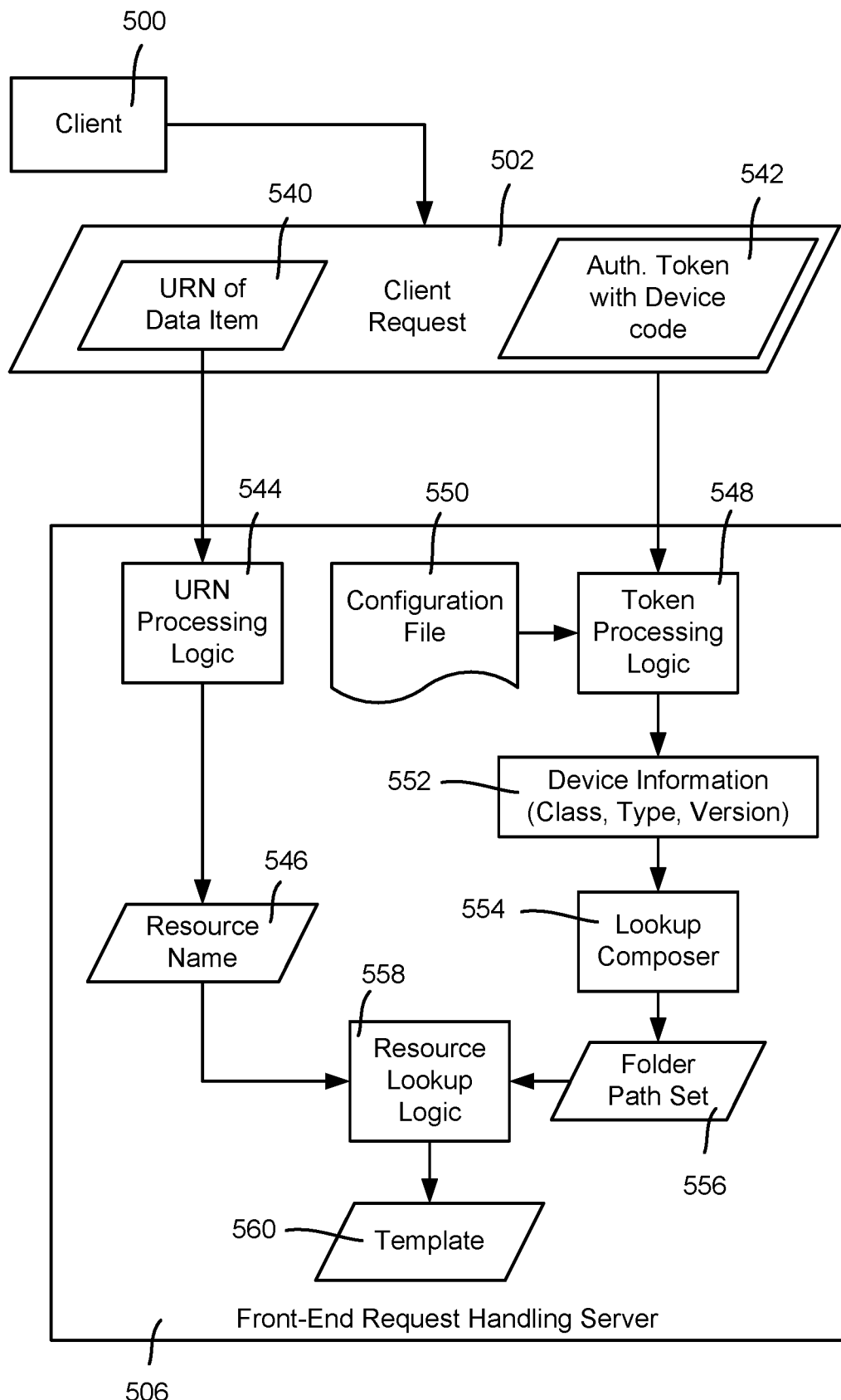
FIG. 5 is an example block and representation of how information associated with a client request may be used to select a client-specific template, according to one or more example implementations.
Figure 6:
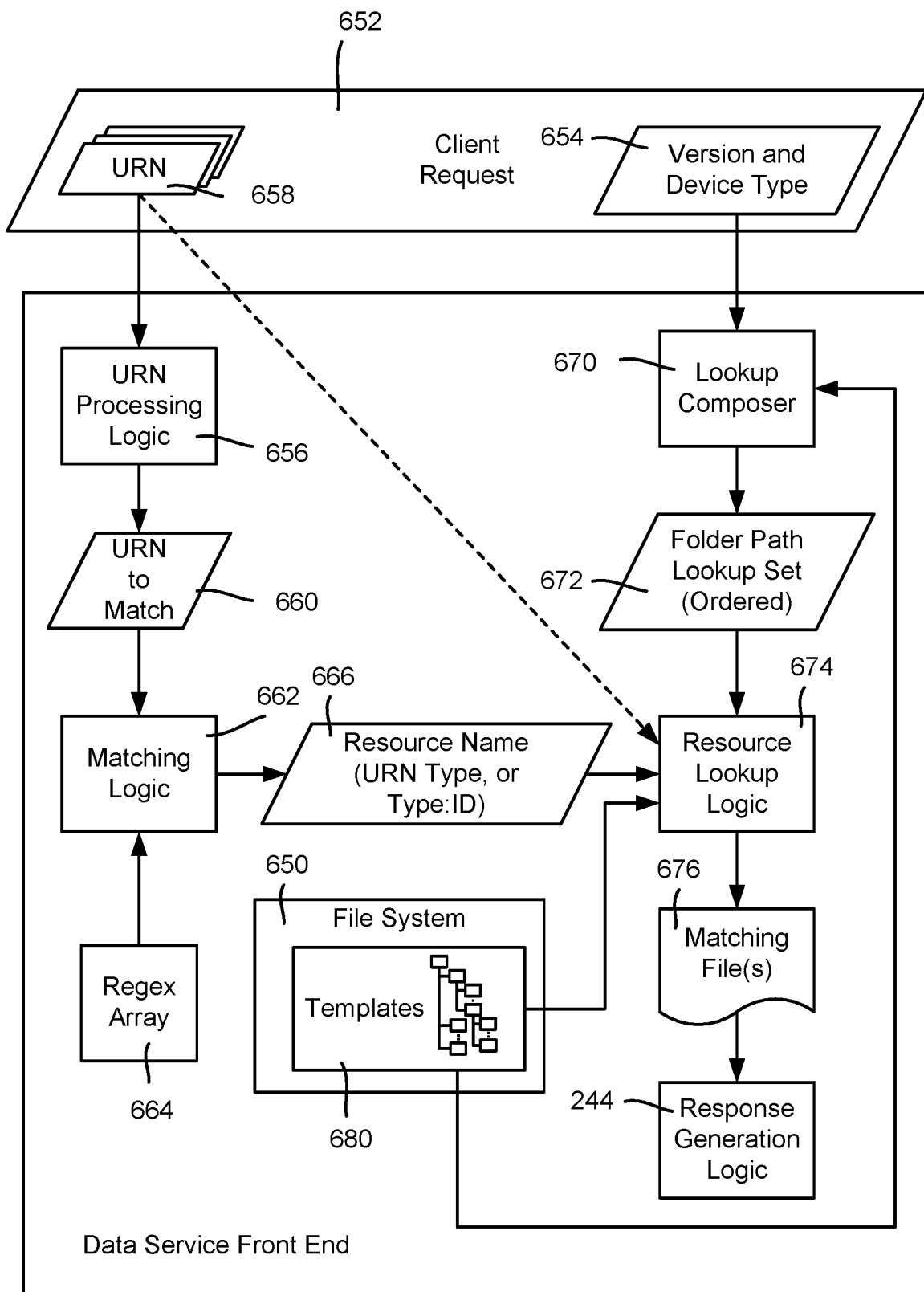
FIG. 6 is an example block and representation of how information associated with a client request may be used to select a client-specific template maintained in a file system hierarchy, according to one or more example implementations.

Turning to aspects related to template selection, FIGS. 5 and 6 show how a request 502 from a client 500 is processed to determine which template to select. As described herein, client requests include an identifier of the desired data such as an object identifier (object ID), which may be in the form of a uniform resource name (URN) 540. A client request also includes a token 542, which among other purposes (e.g., authentication) may include a device code that indicates the type (e.g., the vendor and model as needed to differentiate from others) of the requesting client device, and/or its software version. The software version information may be part of the device code, or may be in another code (e.g., appended to a device-only code); for purposes of explanation, consider that as used herein, "device code" identifies the device and the software version information.

In general, URN processing logic 544 determines a resource name 546 from the URN, which may be a type:ID combination. For example, certain types of requests may be grouped together as a type of resource; e.g., for requests for a television "Series" type, a subset of the template hierarchy may have resource templates named series, requests for a "Season" type may have resource templates named season, and so on. A more specific example of URN processing logic is described herein with reference to FIG. 6.

Along with processing the URN, token processing logic 548 uses information in a configuration file 550 to obtain client device-specific information 552 based upon the device code, e.g., device class, device type, and software version information. For example, each device code, via the configuration file 550 or the like on the front-end data service server 506, may be mapped to a device "class" comprising a category of devices that generally share the same design and thus tend to have the same data requirements, possibly with some device-specific exceptions. For example, a particular smartphone from the same vendor may have at least some of its models configured to run the same client platform software and thus expect the same form of each data item's data. Thus, a device's code and class may be determined by the combination of the device code (from the request) and the data service's configuration file 550, and thus the request need only provide the device code via its token 542.

Using this client device-specific information 552, a lookup composer 554 builds a set of paths to the resources in the hierarchy, including templates. If, for example, the resource hierarchy corresponds to a file system hierarchy, then the paths to the resources are in a set of folder paths 556. A more specific example of token processing logic 548 and corresponding template selection is described herein with reference to FIG. 6.

In one or more example implementations, the folder set's paths are ordered from most specific to least specific, as described below. Resource lookup logic 558 uses the resource name 546 and the folder path set 556 to find the most specific template 558 that applies to the request.

FIG. 6 shows an example of finding applicable resources for a client device (and software version) via a hierarchical file system 650, in which data items are identified and requested via a URN that is unique (at least within the data service). When a client request 652 is received, along with the provider URN ID(s) requested, the client information 654 (e.g., device type and software version) are also known to the data service front end server as described herein.

In one or more example implementations, URN processing logic 656 provides each client identified provider URN into each URN to match 660, and matching logic 662 accesses a set of regular expressions (e.g., arranged in a Regex array 664) to determine a resource name 666 (e.g., a string) corresponding to the type or type:ID that matches the regular expression derived from that URN 660. The rule/resource 666, e.g., represented by the text of the string, is thus determined based upon the provider type or the provider type:ID.

In one or more implementations, the regular expressions are part of a configuration file comprising an array whose elements are a regular expression/rule (e.g., resource) name pair. For example:

```
// rules.json
{
    rules: [
        {
            name: "series",
            regex: "urn:hbo:series:([a-zA-Z0-9_\-])+"
        },
        {
            name: "navigation",
            regex: "urn:hbo:navigation-menu:([a-zA-Z0-9_\-])+"
        },
        // and so on ....
    ]
}
```

A configuration file is read in on service startup, and the regular expressions (with their rule name pairs) are compiled from the configuration file into the Regex array (664). In one or more implementations, this array 664 of regular expressions is then applied, in order, one-by-one via the matching logic 662, to the URN to match 660, and the first regular expression that matches is considered the matching rule; (note that because more than one can match, order matters and thus the array is ordered more specific to less specific, in general). The name of this rule is returned from the matching engine and is used in resource lookup.

For example, for a series type URN, (e.g., "urn:hbo:series:gameofthrones") the selected template filename may be based only on the type, such as "series.hbs" or the like corresponding to the resource name string "series" matched by the matched by the matching logic 662. Overrides/more particular files relative to the type may be made by having the regular expression array have a matching type and ID. For example, a URN such as "urn:hbo:navigation:FAQ" may have an entry in the regular expression array 664 such that the matching logic 662 matches the type (navigation) and ID (FAQ), with a string such as "navigation.FAQ" such that the resource lookup logic 674 looks for an template file named "navigation.FAQ.hbs" or the like.

It should be noted that in a more simplified system, e.g., in which there only relatively a few data items rather than thousands of providers of different types, the data item IDs may be more directly used, (e.g., as represented in FIG. 6 by the dashed arrow). For example, if only dozens of data items had to be dealt with for template selection, then each data item ID (or unique portion thereof) may be used as is the "resource name" for resource lookup, e.g., without regular expression matching and so on, as described herein.

For matching the rule name 666 (e.g., derived from the URN) to a client-specific information (e.g., client device and/or software version 654), which in this example implementation has an associated template file, the file system hierarchy is leveraged. More particularly, based upon the version and device type data 654, a lookup composer 670 builds (or retrieves from a cache if previously built) a set of file system folder paths 672 for this version and device type, in which the paths are ordered based upon most specific to least specific.

For example, a folder path lookup path may include something such as [" . . . \resource\templates\v3\deviceA\series.hbs" and " . . . \resource\ templates \v3\default\series.hbs"]. Note that the file system folders and files may be maintained in relatively fast memory, e.g., RAM, whereby retrieval of the file is extremely rapid.

In this example, within the file system, a template file may exist that corresponds to the type or type:ID for the data item's URN as exemplified above. If a specific template file exists, that template file is used, otherwise the default template file is used. In the above example, for version v3 of a device A, a specific device A series template file is found and used, whereas for version v3 of a device B, no specific template file is found, and thus the default template file is used. In one or more implementations, such a default template file always is present in the hierarchy (or this situation is an error).

It should be noted that the concept of locating information via a combination of regular expression matching, along with hierarchical lookups based upon client-specific data, may be used for other information, in addition to templates. For example, a request for a data item can be expanded into a request for that item plus one or more other data items, (e.g., to pre-populate a client cache), and such a request can be based upon a URN, client-specific expansion rule (e.g., in an expansion rule file in a file system hierarchy) located in generally the same way within a hierarchy of such rules.

To summarize templates and resource loading, including customizing output for specific devices, in one or more implementations, when a client makes an authorized request to a client-specific service, the client provides an authorization token that contains a device code. This device code is used in part, along with the data item or data item type, to locate a template that determines response data shape/formatting as described herein.

Resource lookup may be accomplished for templates through a common resource folder layout convention. In one or more implementations, the convention is exemplified by the following example:

```
resources/
    resource_type_X/
        device_A/
            resource1.res    // here ".res" represents any resource,
                             // including a template file such as
                             // resource1.tmpl
        device_class_A/           device_class_B/
            resource1.res              resource2.res
            resource2.res
        default/
            resource1.res
            resource3.res
        ...
```

Example rules of one example, non-limiting convention are as follows; note that this may be applied to any such resource, including, but not limited to templates:
1. Resources are located under a single top-level 'resources' folder
2. The resources for a resource type are located in single, direct sub-directory under the root 'resources' folder
3. Under the folder for specific resource type, there are a number of (e.g., three) "classes" of folders: device-specific folders, device-class specific folders, and a single default folder. These are technically optional.
4. Given a resource type, a resource name, a device code, and a device class, the lookup is performed by searching the correspondingly-named folders (if they exist) in the following order:
   Device code
   Device class
   Default By way of example, assuming a device code of "device_A", which has corresponding device class "device_class_A", looking up the resource named "resource1.res" would result in device_A/resource1.res. Following the lookup order, querying "resource2.res" produces device_class_A/resource2.res, and querying "resource3.res" produces default/resource3.res, respectively.

Alternatively, assuming a device code of "device_B", which has corresponding device class "device_class_B", resources 1 and 4 are located under "default", and resource2.res is located under device_class_B, respectively.

In one or more implementations, the service returns resources in JSON format. When other formats are needed, each aforementioned directory may be restructured to contain format-specific subfolders that contain the resources (instead of the resources directly). Thus, in the above example, with the addition of XML support, the data becomes:

```
resources/
    resource_type_X/
        device_A/
            json/
                resource1.res
            xml/
                resource1.res
        device_class_A/            device_class_B/
            json/                       json/
                resource1.res               resource2.res
                resource2.res
            xml/ xml/
                resource1.res               resource2.res
                resource2.res
        default/
            json/
                resource1.res
                resource3.res
            xml/
                resource1.res
                resource3.res
```

Resource lookup logic 674 thus uses the ordered path set 672, along with the resource name 666 (URN type or type and ID) to find the most specific template file 676 that applies from among the templates 680. Note that in one or more implementations, only a single such file (if any) is found, which makes management straightforward, e.g., simply add, replace or remove a template file from the set of file system files as a whole, as appropriate. However it is feasible for alternative implementations to return multiple template files that are combined in some way, e.g., to use data from each. Such a system allows delta overrides to be used, e.g., use version 4 template data plus the overrides with template data changes for version 4.1, and so on.

Once the template file (or combined file set) is found, the response generation logic 244 (FIG. 2 and FIG. 6) may then use the template data to format/shape the data item data into the response. As can be seen, for any given data item, a template may be used that is tailored to a specific client software version and/or device type. With responses for multiple devices/classes, templates may be used to customize the format and data returned at the response-entity level, per the device code indicated by the request. The entity keyed by the request is fetched from the corresponding data service, and the template is applied to produce a final result which is returned in the response.

Which template is applied to the entity thus may be determined by a series of rules that are applied to the URN of the entity, where the rule names generally correspond to the names of templates (resources), and the first rule to match is the name of the template (resource) to be applied.

Template Sample

```
{{! Episode template }}
{
{{#jsonProps}}
    {{#with fields}}
        {{> default/partials/playableBase}}
        {{jsonSimpleProp this name="numberInSeason"}}
        {{jsonSimpleProp this name= "numberInSeries"}}
    {{/with}}
    {{> default/partials/references}}
{{/jsonProps}}
}
{{! Partial template for a "playable" entity (e.g. a feature, episode, or
    extra). This may be wrapped using the jsonProps helper }}
{{> default/partials/viewableBase}}
{{jsonSimpleProp this name="releaseYear"}}
{{#with (selectDefaultEdit edits)}}
{{#if this}}
{{jsonSimpleProp this name="creditsStartTime"}}
{{jsonSimpleProp this name="runtime"}}
{{jsonSimpleProp rating name="code" alias="ratingCode"}}
{{#if advisories}}
{{> default/partials/advisoryCodes advisories}}
{{/if}}
{{/if}}
{{/with}}
{{> default/partials/credits}}
{{> default/partials/soundtrack}}
Template Sample (cont.)
/**
 * Copyright disclaimer applies with respect to the facsimile
 reproduction of the
 * patent document or the patent disclosure, as it appears in the Patent and
 * Trademark Office patent file or records, but otherwise the copyright
 owner reserves all copyright rights whatsoever; for example:
 * @preserve Copyright (c) 2015 Home Box Office, Inc. as
 an unpublished
 * work. Neither this material nor any portion hereof may be copied or
 * distributed without the express written consent of Home
 Box Office, Inc.
 *
 * This material also contains proprietary and confidential information
 * of Home Box Office, Inc. and its suppliers, and may not be used by or
 * disclosed to any person, in whole or in part, without the prior written
 * consent of Home Box Office, Inc.
 */
'use strict';
var editSelectors = require('../../../../selectors/editSelectors');
/**
 * Return the default edit, per the edit selectors logic
 * @param {Object} context
 * @param {Object} options
 * @returns {Object|undefined}
 */
function selectDefaultEdit(context, options) {
    return editSelectors.selectDefaultEdit(context);
}
module.exports = selectDefaultEdit;
```

Figure 7:
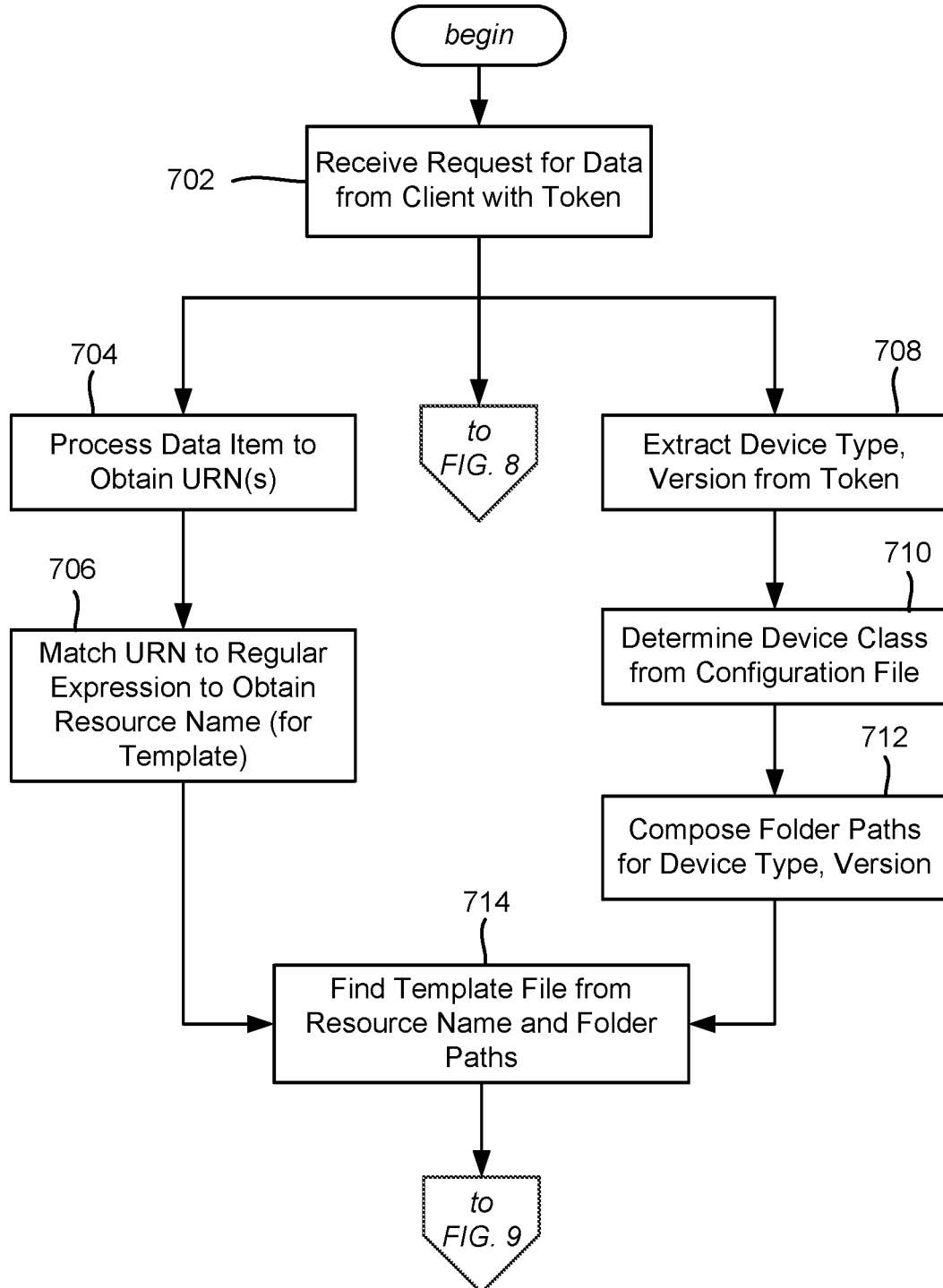
FIGS. 7-9 comprise a flow diagram showing example logic/steps that may be taken to select and apply a template to process data into a client-specific response, according to one or more example implementations.

FIG. 7 is a flow diagram showing example steps that may be taken in one or more implementations when a request for data is received at a front-end data service, as represented by step 702. Step 704 (if needed) represents processing the client request into its identifiers (URNs), which for each URN step 706 matches the data item identifier URN against the regular expression array to find a resource (rule) name. As described above, the resource/rule name corresponds to the filename; e.g., the resource name for an episode type URN may be the string "episode" with the appropriate extension appended for episode template files.

Step 708 represents extracting the device type and software version information from the token, which step 710 processes into the device class. Step 712 composes the ordered set of folder paths based upon the device class, device type and/or software version.

With the resource name and folder paths, the template file is located at step 714. The process continues to FIG. 9, step 902.

It should be noted that the two exemplified branches of FIG. 7 may have their steps performed at generally the same time (along with the steps of FIG. 8, which as described below are related to retrieving the requested data item). In a parallel system, these operations may occur at basically the same time, with step 714 awaiting both results before proceeding to step 902 of FIG. 9, which awaits the template selection and data availability (via FIG. 8). In a single-threaded programming environment, these exemplified steps may be performed via asynchronous sub-tasks so that, for example, nothing blocks waiting for another portion to complete; e.g., the data item retrieval of FIG. 8 can be started while the regular expression-related steps and the folder path composition are occurring. For example, a client request for a data item may have an asynchronous promise for that data initially returned (wherein a "promise" in asynchronous programming environments is basically a placeholder in which data is returned when ready, sometimes referred to as a "future" or "delay"), with the promise fulfilled when the data is obtained.

Figure 8:
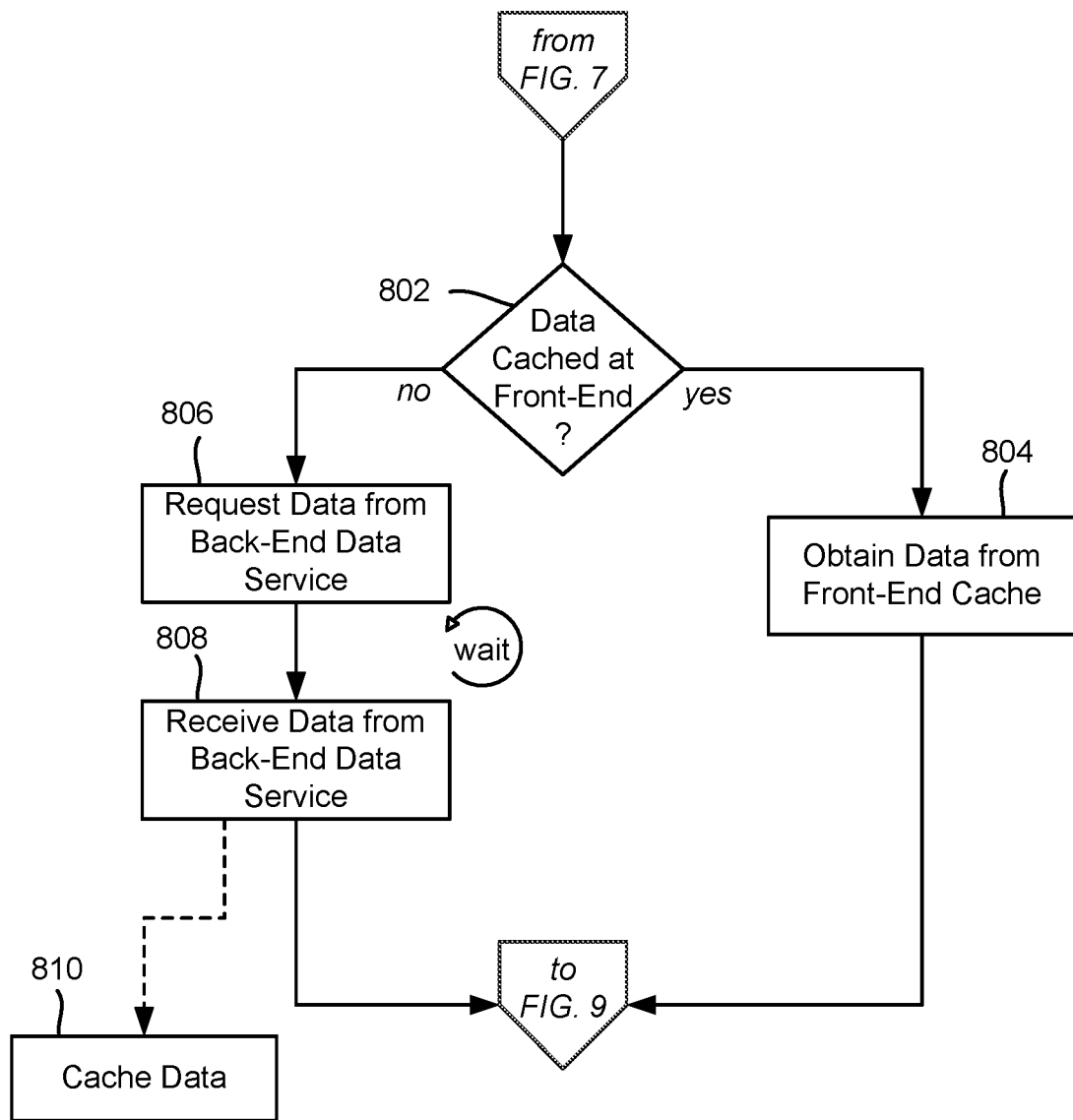

FIG. 8 shows general steps related to retrieving the requested data item. Step 802 represents checking the front-end cache (e.g., the front-end server's in-memory cache, and if not found, the front-end distributed or caches). If found (and not expired), step 804 returns the data item and the process continues to FIG. 9. Note that although not shown if FIG. 8, if not found in the front-end server's in-memory cache but found in the front-end distributed cache, the data item is written through to the front-end server's in-memory cache.

If not cached at a front-end cache, step 806 requests the data item from the back-end portion of the data service. Step 808 receives the data item, which is after some delay, (at least a network request/response delay, but longer if not cached at the back-end, because the back-end needs to obtain and if needed build the data item via one or more of the backing data sources). The process continues to FIG. 9; (the data item received from the back-end data service also may be cached at the front-end distributed cache and front-end server in-memory cache, as represented by step 810). Note that it is possible for an error to be returned from the back-end data service, in which event the error may be returned to the client, however for purposes of explanation errors the handling of such errors is not further described herein.

Figure 9:
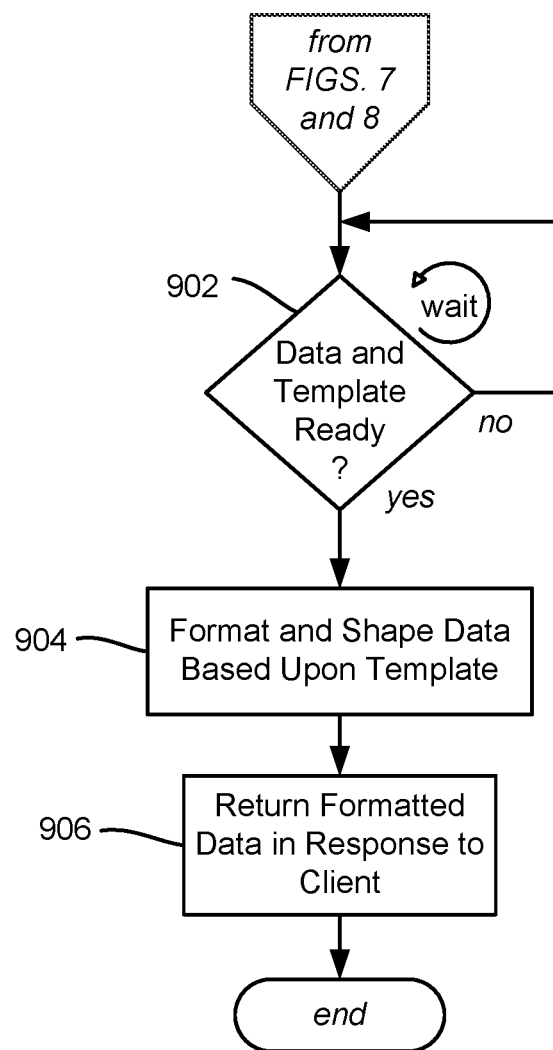

FIG. 9 represents applying the template to the data item data, e.g., including a (e.g., JSON, XML or other) generally device and software generic data blob, that is in a general form that is not client-specific. Step 902 represents waiting for the template to be selected, if not already selected; (e.g., because the data item was rapidly retrieved from a front-end cache in FIG. 8 before the steps of FIG. 7 completed).

Once the data is obtained and the selected template file located and accessed, step 904 applies the template to format and/or shape the data from the general data item form into the client-specific form as expected by the client. Thus, based upon the URN and a given client device class or type, and/or software version, data is returned to the client at step 906 in the data form (e.g., format and shape, and possibly anything else the client expects) as expected by the client.

As can be seen, described is a technology by which data of a data item in a general form may be processed into a client-specific form and returned in response to a client request for that data item. A client request includes a data item identifier and client-specific information, such as included in an authorization token. The data item is processed into a data ID or data type:ID, such as by generating a regular expression from a URN that is the identifier of the data item. The client-specific information may be obtained from the token, e.g., a device code, and used to determine a device class, device type and/or client platform software version. The template is found in a hierarchy of templates based upon the client-specific information and the data type or data type:ID; for example, the client-specific information may be used to determine a subset of template folders that may have a file named based upon the data type or data type:ID, and the subset of folders may be evaluated to find a matching file. The folders may be ordered from most specific to least specific, so as to locate the most specific template file that applies.

One or more aspects are directed towards receiving, at a data service, a client request for data of an identified data item from a client device, and selecting a template based upon the identified data item and client-specific information. The data of the identified data item is obtained in a general form that is not client-specific. Described is processing the data of the identified data item in the general form, based upon information in the template, into data of the identified data item data in a client-specific form, and returning the data in the client-specific form of the identified data item from the data service to the client device in response to the client request.

Receiving the client request for the identified data item may include receiving a request for a provider node of a client graph. Selecting the template based upon the identified data item may include determining a type of the data item; determining the type of the data item may include matching an identifier of the data item to a regular expression and rule (template) name. The client request may be associated with a token, and the client-specific information may be obtained based upon information in the token.

Selecting the template based upon the identified data item and client-specific information may include using an identifier of the data item and a device type of the client device. Selecting the template based upon the identified data item and the client-specific information may include determining a device class from the client-specific information of the client device, and selecting the template based upon the identified data item and client-specific information may include using an identifier of the data item and the device class of the client device.

The template may be maintained as a file system file. Selecting the template may be based upon the identified data item and the client-specific information, and may include using information based upon the identifier of the data item to determine a filename, and using information based upon the client-specific information to determine a set of one or more file system folders for locating the template file. Selecting the template based upon the identified data item and the client-specific information may include determining a type of the data item, determining a device class from the client-specific information of the client device, and determining a software version from the client-specific information of the client device, and selecting the template based upon the type of the data item, the device class and the software version.

Selecting the template based upon the identified data item and the client-specific information may include determining a type of the data item, determining a device type from the client-specific information of the client device, and determining a software version from the client-specific information of the client device; the template may be selected based upon the type of the data item, the device type and the software version.

One or more aspects are directed towards request handling logic of a data service that is configured to receive client requests for data items, to obtain data of the data item in a general form, and to return responses to the client requests, including to receive a client request for an identified data item. Response generation logic, coupled to the request handling logic, is configured to locate a template corresponding to the identified data item and client-specific information, and in conjunction with information in the template, to process the data of the data item from the general form into a client-specific form. The request handling logic returns the data of the identified data item in the client-specific form response to the client request.

The request for the identified data item may include a request for a data provider corresponding to a node of a client graph. The request handling logic may attempt to obtain the data of the identified data item from a cache (of a data service cache set comprising one or more data service caches), and for any data item not obtained from the data service cache set, from one or more backing data sources. The client-specific information may be received at the data service via a token associated with the client request, in which token processing logic determines the client-specific information from the token.

The template may correspond to a template file, and the response generation logic may locate the template file based in part upon the identified data item, and in part upon client-specific information. The client-specific information may include a client device type and/or a client platform software version. The template file may have a filename corresponding to the identified data item, and the client-specific information may correspond to a folder in a file system hierarchy of folders and files.

One or more aspects are directed towards receiving a request from a client device for an identified data item, in which the request is associated with information that identifies the client device, such as via a token including a device code and/or via some other mechanism for identifying the requesting entity, such as a User-Agent HTTP request header or the like. Further described is processing the device code into client-specific information, locating a template corresponding to the identified data item and based upon the client-specific information and obtaining data of the identified data item in a general form. Information in the template is used to process the data of the identified data item in the general form into data of the identified data item in a client-specific form. A response to the client device is returned in response to the request, including returning data of the identified data item in the client-specific form.

Locating the template may include using the client-specific information to determine a subset of file system folders of a file system, in which the subset may be ordered according to the client-specific information from a most specific folder to a least specific folder. A filename may be determined based upon the identified data item, and the template found within the set of folders as a template file with the filename, by evaluating the folders from the most specific folder of the subset towards the least specific folder of the subset until the file is found.

Processing the device code into the client-specific information may include determining a device type, device class and/or software version from the device code. Locating the template corresponding to the identified data item may include matching at least part of an identifier of the data item to a regular expression and associated rule.

Processing the device code into the client-specific information may include obtaining a template name based upon at least part of an identifier of the data item, along with determining a device type, device class and/or software version from the device code. Aspects may include, using the data type as a template filename of a file system including template files, using the client-specific information to determine a subset of template-related file system folders of the file system, and finding the template within the set of folders as a template file having the filename.

Example Computing Device

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 10 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 10:
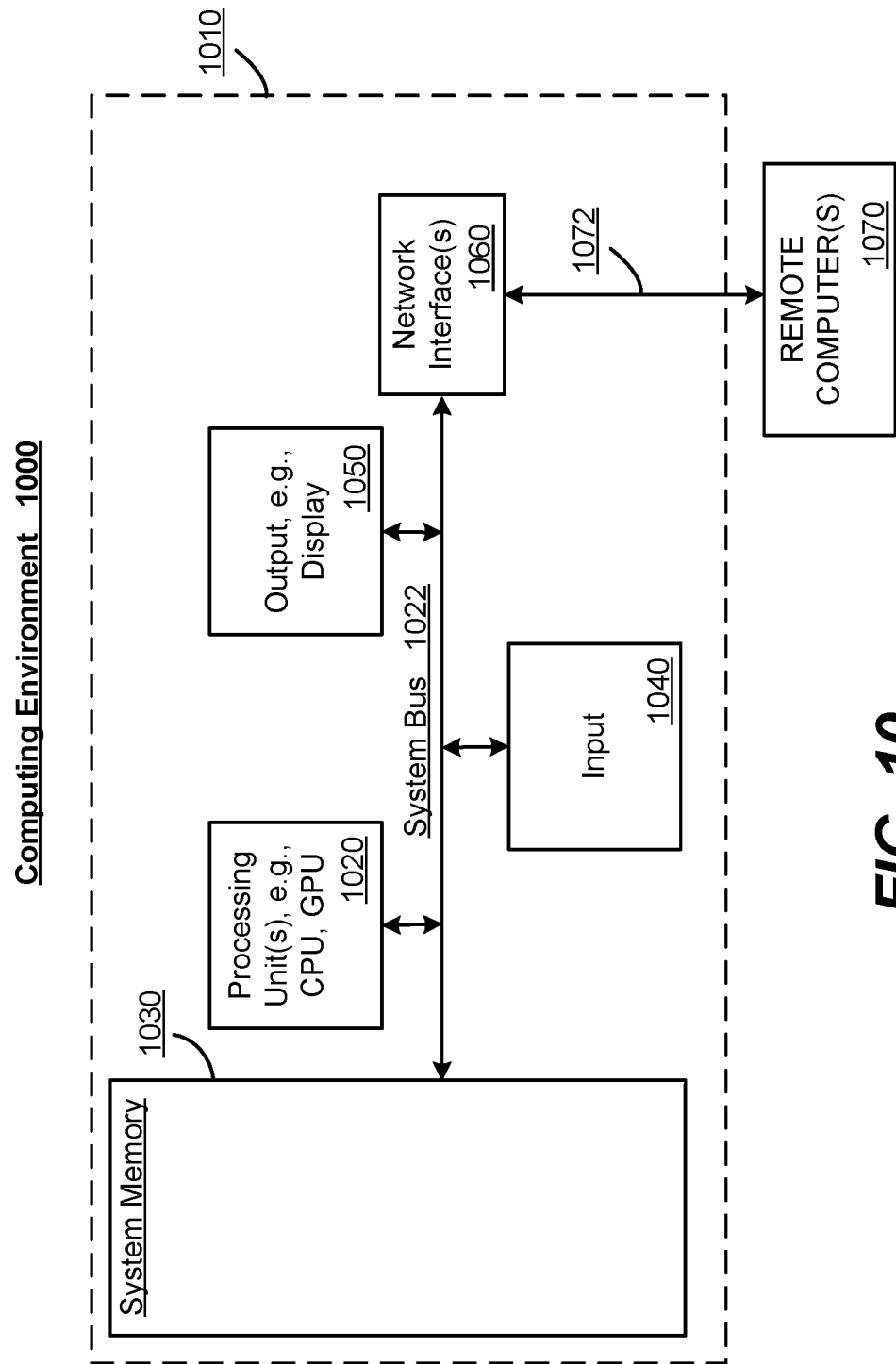
FIG. 10 is a block diagram representing an example computing environment into which aspects of the subject matter described herein may be incorporated.

FIG. 10 thus illustrates an example of a suitable computing system environment 1000 in which one or aspects of the implementations described herein can be implemented, although as made clear above, the computing system environment 1000 is only one example of a suitable computing environment and is not intended to suggest any limitation as to scope of use or functionality. In addition, the computing system environment 1000 is not intended to be interpreted as having any dependency relating to any one or combination of components illustrated in the example computing system environment 1000.

With reference to FIG. 10, an example device for implementing one or more implementations includes a general purpose computing device in the form of a computer 1010. Components of computer 1010 may include, but are not limited to, a processing unit 1020, a system memory 1030, and a system bus 1022 that couples various system components including the system memory to the processing unit 1020.

Computer 1010 typically includes a variety of machine (e.g., computer) readable media and can be any available media that can be accessed by a machine such as the computer 1010. The system memory 1030 may include computer storage media in the form of volatile and/or nonvolatile memory such as read only memory (ROM) and/or random access memory (RAM), and hard drive media, optical storage media, flash media, and so forth. By way of example, and not limitation, system memory 1030 may also include an operating system, application programs, other program modules, and program data.

A user can enter commands and information into the computer 1010 through one or more input devices 1040. A monitor or other type of display device is also connected to the system bus 1022 via an interface, such as output interface 1050. In addition to a monitor, computers can also include other peripheral output devices such as speakers and a printer, which may be connected through output interface 1050.

The computer 1010 may operate in a networked or distributed environment using logical connections to one or more other remote computers, such as remote computer 1070. The remote computer 1070 may be a personal computer, a server, a router, a network PC, a peer device or other common network node, or any other remote media consumption or transmission device, and may include any or all of the elements described above relative to the computer 1010. The logical connections depicted in FIG. 10 include a network 1072, such as a local area network (LAN) or a wide area network (WAN), but may also include other networks/buses. Such networking environments are commonplace in homes, offices, enterprise-wide computer networks, intranets and the Internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

CONCLUSION

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method comprising:
receiving, by a system comprising a processor via a data service, a client request from a client device, wherein the client request comprises an identifier of a user interface object of a client user interface and client-specific information for the client device;

determining, by the system via the data service, a resource name for the user interface object based on the identifier;

generating, by the system via the data service, a set of paths to templates for formatting the user interface object based on the client-specific information;

ordering, by the system via the data service, the set of paths from most specific to least specific according to a defined hierarchy for the client specific information;

selecting, by the system via the data service, a most specific path of the set of paths that leads to a template corresponding to the resource name;

obtaining, by the system via the data service, the user interface object in a general form that is not client-specific;

processing, by the system via the data service, the user interface object from the general format, based upon information in the template, into a customized user interface object that is in a client-specific format for the client device; and returning, by the system via the data service, the customized user interface object to the client device in response to the client request.

2. The method of claim 1, wherein the client request further comprises a request for a provider node of a client user interface graph.

3. The method of claim 1, wherein the determining the resource name comprises determining a type of the user interface object.

4. The method of claim 3, wherein determining the type of the user interface object comprises matching the identifier of the user interface object to a regular expression.

5. The method of claim 1, wherein the client-specific information indicates a device type of the client device and wherein the generating the set of paths comprises generating the set of paths based on the device type.

6. The method of claim 1, further comprising determining, by the system via the data service, a device class from the client-specific information, and wherein the generating the set of paths comprise generating the set of paths based on the device class.

7. The method of claim 1, wherein the template is maintained as a file system file, and wherein the generating the set of paths comprises using information based upon the client-specific information to determine a set of one or more file system folders for locating the template.

8. The method of claim 1, further comprising determining, by the system via the data service based on the client-specific information, a software version employed by the client device in association with rendering the user interface object, and wherein the generating the set of paths comprises generating the set of paths based on the software version.

9. The method of claim 1, wherein the generating the set of paths comprises, determining a type of the user interface object, determining a device type from the client-specific information of the client device, and determining a software version of software executing on the client device from the client-specific information of the client device, and generating the set of paths based upon the type of the user interface object, the device type and the software version.

10. A system comprising:
a processor; and
a memory communicatively coupled to the processor, the memory having stored therein computer-executable instructions, comprising:
  request handling logic of a data service, the request handling logic configured to:
    receive a client request from a client device, wherein the client request comprises an identifier of a user interface object of a client user interface and client-specific information for the client device,
    determine a resource name for the user interface object based on the identifier, and
    obtain the user interface object in a general format that is not client-specific;
  response generation logic coupled to the request handling logic, the response generation logic configured to:
    generate a set of paths to templates for formatting the user interface object based on the client-specific information;
    order the set of paths from most specific to least specific according to a defined hierarchy for the client-specific information;
    locate a most specific path of the set of paths that leads to a template corresponding to the resource name, and
    process the user interface object from the general format into a customized format for the client device based on the template; and
  the request handling logic further configured to return the customized format of the user interface object in response to the client request.

11. The system of claim 10, further comprising a data service cache set comprising one or more data service caches, and wherein the request handling logic attempts to obtain the user interface object from a cache of the data service cache set, and if the user interface object is not obtained from the data service cache set, obtain the user interface object from one or more backing data sources.

12. The system of claim 10, wherein the client-specific information comprises a device token and wherein the system further comprises, token processing logic that determines, based on the token, at least one of, a device class of the client device, a device type of the client device, or a software version employed by the client device in association with rendering the user interface object.

13. The system of claim 12, wherein the response generation logic is configured to generate the set of paths based on the device class, the device type, and the software version, and wherein the defined hierarchy is based on the device class, the device type, and the software version.

14. The system of claim 10, wherein the template corresponds to a template file, and wherein the response generation logic locates the most specific path to the template file based in part upon the user interface object, and in part upon the client-specific information comprising at least one of a client device type or a software version of software executing on the client device.

15. The system of claim 14, wherein the template file has a filename corresponding to the user interface object, and wherein the client-specific information corresponds to a folder in a file system hierarchy of folders and files.

16. A non-transitory computer-readable medium having instructions stored thereon that, in response to execution, cause a system including a processor to perform operations comprising:
  receiving a request from a client device, wherein the request comprises an identifier of a user interface object of a client user interface and a client token corresponding to client-specific information for the client device;
  determining a resource name for the user interface object based on the identifier;
  generating a set of paths to templates for formatting the user interface object based on the client-specific information;
  ordering the set of paths from most specific to least specific according to a defined hierarchy for the client specific information;
  selecting a most specific path of the set of paths that leads to a template corresponding to the resource name;
  obtaining the user interface object in a general format that is not client-specific;
  using information in the template to process the user interface object from the general format into a customized user interface object that is in a client-specific format for the client device; and
  returning the customized user interface object to the client device in response to the request.

17. The non-transitory computer-readable medium of claim 16, wherein the generating the set of paths comprises using the client-specific information to determine a subset of file system folders of a file system.

18. The non-transitory computer-readable medium of claim 16, wherein the client-specific information comprises at least one of a device type, a device class, or a software version of software executing on the client device.

19. The non-transitory computer-readable medium of claim 18, wherein the defined hierarchy is based on the device type, the device class and the software version.

20. The non-transitory computer-readable medium of claim 16, wherein the request further comprises a request for a provider node of a client user interface graph.

* * * * *